US008507392B2

(12) United States Patent
Yamauchi et al.

(10) Patent No.: US 8,507,392 B2
(45) Date of Patent: Aug. 13, 2013

(54) LAS-TYPE FLOAT GLASS

(75) Inventors: Hideo Yamauchi, Otsu (JP); Tomohiro Nagakane, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 13/062,564

(22) PCT Filed: Aug. 11, 2009

(86) PCT No.: PCT/JP2009/064185
§ 371 (c)(1),
(2), (4) Date: Mar. 7, 2011

(87) PCT Pub. No.: WO2010/026854
PCT Pub. Date: Mar. 11, 2010

(65) Prior Publication Data
US 2011/0160033 A1   Jun. 30, 2011

(30) Foreign Application Priority Data
Sep. 8, 2008   (JP) .................... 2008-229660

(51) Int. Cl.
*C03C 10/12* (2006.01)
*C03C 10/14* (2006.01)

(52) U.S. Cl.
USPC ................................... 501/4; 501/7

(58) Field of Classification Search
USPC ............... 501/4, 7; 65/99.2, 99.3, 99.4, 33.8
See application file for complete search history.

(56) References Cited

U.S. PATENT DOCUMENTS

| | | | |
|---|---|---|---|
| 6,089,043 A | 7/2000 | Courtemanche et al. | |
| 6,593,258 B1 | 7/2003 | Shimatani et al. | |
| 7,141,521 B2 * | 11/2006 | Siebers et al. | 501/32 |
| 7,507,681 B2 * | 3/2009 | Aitken et al. | 501/4 |
| 8,015,842 B2 * | 9/2011 | Lautenschlaeger et al. | 65/99.1 |
| 8,043,985 B2 * | 10/2011 | Yagi et al. | 501/4 |
| 2002/0011481 A1 | 1/2002 | Melson et al. | |
| 2002/0023463 A1 | 2/2002 | Siebers et al. | |
| 2002/0044447 A1 | 4/2002 | Melson et al. | |
| 2003/0054935 A1 | 3/2003 | Kitamura et al. | |
| 2005/0143247 A1 * | 6/2005 | Siebers et al. | 501/4 |
| 2007/0004578 A1 * | 1/2007 | Monique Comte | 501/4 |
| 2007/0015653 A1 * | 1/2007 | Lautenschlaeger et al. | 501/68 |
| 2007/0022783 A1 | 2/2007 | Ban et al. | |
| 2007/0213192 A1 * | 9/2007 | Monique Comte et al. | 501/7 |
| 2007/0259767 A1 * | 11/2007 | Siebers et al. | 501/59 |
| 2007/0293386 A1 * | 12/2007 | Goto | 501/4 |
| 2009/0314034 A1 * | 12/2009 | Goulas et al. | 65/85 |
| 2010/0071419 A1 | 3/2010 | Ban et al. | |

FOREIGN PATENT DOCUMENTS

| | | |
|---|---|---|
| CN | 1332329 | 1/2002 |
| CN | 1942410 | 4/2007 |
| JP | 39-21049 | 9/1964 |
| JP | 40-20182 | 9/1965 |
| JP | 1-308845 | 12/1989 |
| JP | 11-507006 | 6/1999 |
| JP | 11-310421 | 11/1999 |
| JP | 2000-44282 | 2/2000 |
| JP | 1 114 803 | 7/2001 |
| JP | 2001-354429 | 12/2001 |
| JP | 2001-354445 | 12/2001 |
| JP | 2001-354446 | 12/2001 |
| JP | 2003-20254 | 1/2003 |

OTHER PUBLICATIONS

International Preliminary Report on Patentability together with English translation of the Written Opinion issued Apr. 21, 2011 in International (PCT) Application No. PCT/JP2009/064185.
International Search Report issued Nov. 17, 2009 in International (PCT) Application No. PCT/JP2009/064185.
Chinese Office Action issued Nov. 1, 2012 in corresponding Chinese Application No. 200980122834.7, with partial English translation thereof.

* cited by examiner

*Primary Examiner* — Karl Group
(74) *Attorney, Agent, or Firm* — Wenderoth, Lind & Ponack, L.L.P.

(57) ABSTRACT

An LAS-type float glass, which is substantially free of $As_2O_3$ and/or $Sb_2O_3$ and precipitates a β-quartz solid solution or a β-spodumene solid solution as a main crystal by heat treatment, wherein, when $C_1$ [mass %] represents the content of $SnO_2$ at a glass surface, $C_0$ [mass %] represents the content of $SnO_2$ at a depth of 0.5 mm from the glass surface, and k [mass %/mm] represents an $SnO_2$ concentration gradient defined by $k=(C_1-C_0)/0.5$, the LAS-type crystallized glass satisfies relationships of $K \leq 2$ and $C_0 \leq 0.8$ with respect to at least one surface thereof.

4 Claims, No Drawings

LAS-TYPE FLOAT GLASS

TECHNICAL FIELD

The present invention relates to an $Li_2O$—$Al_2O_3$—$SiO_2$-based glass (LAS-type float glass) formed by a float process and to an LAS-type crystallized glass formed by crystallizing the LAS-type float glass.

BACKGROUND ART

A crystallized glass is a material exhibiting unique characteristics owing to various crystals precipitating in the glass. For example, an LAS-type crystallized glass formed by precipitating crystals of a β-quartz solid solution, β-spodumene, or the like in the glass exhibits extremely low expansion or minus expansion, and hence exhibits high mechanical strength and high thermal shock resistance compared with ordinary glasses. Thus, the LAS-type crystallized glass is used for a front glass for a kerosine stove, a wood stove, or the like, a substrate for a high-tech product such as a substrate for a color filter or an image sensor, a setter for firing an electronic part, a tray for a microwave oven, a top plate for induction heating cooking, a window glass for a fire protection door, or the like. For example, Patent Documents 1 to 3 disclose a transparent LAS-type crystallized glass formed by precipitating a metastable β-quartz solid solution ($Li_2O.Al_2O_3.nSiO_2$ [provided that $n \geq 2$]) as a main crystal and a white opaque LAS-type crystallized glass formed by precipitating a stable β-spodumene solid solution ($Li_2O.Al_2O_3.nSiO_2$ [provided that $n \geq 4$]) obtained by further subjecting a β-quartz solid solution to higher temperature treatment.

By the way, a crystallizable glass, which is mother glass of those crystallized glasses, is generally formed into a plate shape by a roll-out process involving sandwiching a molten glass directly with two refractory rollers and drawing the molten glass. However, the surfaces of the molten glass are directly in contact with the surfaces of the refractory rollers, and hence the roll-out process is apt to cause problems such as imprint of the surface shapes of the refractory rollers and swelling on the surfaces of the glass. Further, the molten glass is forcibly formed into a plate shape by the refractory rollers while being cooled, and hence unevenness is apt to occur. As a result, obtaining a plate glass having a uniform quality is difficult. Thus, a plate glass formed by the roll-out process has involved a problem that more time and more cost are required for its production because the surfaces of the glass need to be subjected to machine polishing to obtain smooth and flat surfaces.

Note that in the roll-out process, the width of a glass plate is restricted depending on the length of the refractory roller, and it is difficult to control the molten glass so that the molten glass extends uniformly in the longitudinal direction of the refractory roller, resulting in easy reduction in quality. Thus, producing a larger glass plate by the roll-out process is difficult.

On the other hand, a float process (float forming process) has been conventionally proposed as another forming process. The float process is good in production efficiency because glass can be formed into a large plate shape, and can provide glass having a high surface quality. The float process is a process involving feeding a molten glass onto a bath of a molten metal bath such as a molten metal tin bath, to thereby form the molten glass into a plate shape. To be specific, a molten glass is fed onto a molten metal bath in a float forming chamber in which a reducing atmosphere is maintained, thereby producing a plate-shaped glass (glass ribbon) having an equilibrium thickness, and the glass ribbon is then drawn on the molten metal bath so as to have a predetermined thickness, to thereby form a plate glass. The float process has been widely adopted as a process of continuously producing large quantities of plate glass products that require a high surface quality (see, for example, Patent Document 4 or 5).

CITATION LIST

Patent Document 1: JP 39-21049 B
Patent Document 2: JP 40-20182 B
Patent Document 3: JP 01-308845 A
Patent Document 4: JP 2001-354429 A
Patent Document 5: JP 2001-354446 A

SUMMARY OF INVENTION

Technical Problem to be Solved

In the case where an LAS-type float glass is formed by using a float process, a molten glass is kept in a float forming chamber with high temperature for about 5 to 30 minutes until the molten glass becomes a glass ribbon having an equilibrium thickness. Thus, the devitrification of glass is apt to occur in the float process, compared with in a roll-out process involving forming a molten glass forcibly into a plate shape by cooling the molten glass for a short time from several seconds to several tens of seconds. Further, undesirable other crystals derived from $SnO_2$, such as cassiterite, may be precipitated in a glass surface layer. Alternatively, glass may be reduced with a reducing gas in the float forming chamber. As a result, a metal colloid such as an Sn colloid may be formed, resulting in surface coloring or a surface defect.

Thus, the resultant LAS-type float glass not only may be inferior in surface quality and outer appearance, but also may break because of the difference in a thermal expansion coefficient between a devitrified part and glass in the glass surface layer or of the surface defect. Further, even if a crystallizable glass without any break is obtained, the crystallizable glass may break in a subsequent heat treatment step (crystallization step).

In view of the above-mentioned problems in the prior arts, an object of the present invention is to provide an LAS-type float glass in which devitrification in a glass surface layer caused during forming by a float process is suppressed and surface coloring and a surface defect are reduced, and an LAS-type crystallized glass formed by crystallizing such the LAS-type float glass.

Solution to Problem

The inventors of the present invention have made various studies. As a result, the inventors have found that an LAS-type float glass and an LAS-type crystallized glass formed by crystallizing the LAS-type float glass have a high content of $SnO_2$ in a devitrified portion in each of their surface layers. Thus, the inventors have found that the problems can be solved by controlling the content of $SnO_2$ in the glass surface layer. Consequently, the finding is proposed as the present invention.

That is, the present invention relates to an LAS-type float glass, which is substantially free of $As_2O_3$ and/or $Sb_2O_3$ and precipitates a β-quartz solid solution or a β-spodumene solid solution as a main crystal by heat treatment, in which, when $C_1$ [mass %] represents a content of $SnO_2$ at a glass surface, $C_0$ [mass %] represents a content of $SnO_2$ at a depth of 0.5 mm from the glass surface, and k [mass %/mm] represents an $SnO_2$ concentration gradient defined by $k=(C_1-C_0)/0.5$, the LAS-type float glass satisfies relationships of $K \leq 2$ and $C_0 \leq 0.8$ with respect to at least one surface thereof. Here, the term "LAS-type float glass" refers to a crystallizable glass which is formed by a float process and precipitates an $Li_2O$—$Al_2O_3$—$SiO_2$-based crystal as a main crystal by heat treatment. Further, the phrase "content $C_1$ of $SnO_2$ at a glass surface" refers to the content of $SnO_2$ at a depth of 1 μm from the glass surface.

It has been found that the LAS-type float glass exhibits an approximately constant value in the content of $SnO_2$ at a depth of more than 0.5 mm from the glass surface, but a concentration gradient occurs as the content of $SnO_2$ increases almost monotonically from the depth of 0.5 mm in the glass to the glass surface. This is derived from the fact that metal tin vapor is diffused into a glass surface layer in a float forming chamber. Here, the content of $SnO_2$ at the depth of 0.5 mm in the glass almost corresponds to the content of $SnO_2$ as a fining agent contained in the glass.

In the present invention, the $SnO_2$ concentration gradient k [mass %/mm] from the depth of 0.5 mm from the glass surface to the glass surface and the content $C_0$ [mass %] of $SnO_2$ at the depth of 0.5 mm from the glass surface are defined as described above. As a result, during float forming, devitrification in a glass surface layer can be suppressed, and moreover, it is possible to suppress undesirable other crystals of $SnO_2$ and coloring or a surface defect caused by a metal colloid. Thus, the resultant LAS-type float glass has a uniform quality and an excellent surface quality, and has an advantage that its production cost is low because the surface of the glass is not required to be subjected to machine polishing. Further, occurrence of a surface crack or break of the glass can be prevented in the subsequent crystallization step, and problems will not occur such that the outer appearance is damaged and the thermal and mechanical strengths are reduced remarkably.

Note that $As_2O_3$ and $Sb_2O_3$ are environmental load substances, and are reduced by a reducing atmosphere in a float forming chamber to produce metal colloids on a glass surface. As a result, undesired coloring is apt to occur remarkably in a glass surface layer. The LAS-type crystallized glass of the present invention is substantially free of $As_2O_3$ and/or $Sb_2O_3$ as a fining agent (agents), and hence a coloring problem derived from those components can be solved. Further, a demand from an environmental aspect that has been increasing more and more in recent years can be also coped with. Here, the phrase "substantially free of $As_2O_3$ and/or $Sb_2O_3$" means that $As_2O_3$ and/or $Sb_2O_3$ are/is not added intentionally as a glass material (materials), and refers to a level at which $As_2O_3$ and/or $Sb_2O_3$ are/is contained as an impurity (impurities). To be specific, the phrase refers to the fact that the content of each of those components is 0.1 mass % or less in glass composition.

Second, the LAS-type float glass of the present invention preferably comprises a composition containing, in terms of mass %, 55 to 75% of $SiO_2$, 17 to 27% of $Al_2O_3$, 2 to 5% of $Li_2O$, 0 to 1.5% of $MgO$, 0 to 1.5% of $ZnO$, 0 to 5% of $BaO$, 0 to 2% of $Na_2O$, 0 to 3% of $K_2O$, 0 to 4% of $TiO_2$, 0 to 2.5% of $ZrO_2$, 0 to 0.8% of $SnO_2$, and 2 to 6% of $TiO_2+ZrO_2+SnO_2$.

Third, an LAS-type crystallized glass of the present invention is formed by crystallizing anyone of the LAS-type float glasses as above.

Fourth, the present invention relates to an LAS-type crystallized glass, which is formed by crystallizing an LAS-type float glass, is substantially free of $As_2O_3$ and/or $Sb_2O_3$, and comprises a β-quartz solid solution or a β-spodumene solid solution as a main crystal, wherein, when $C_1$ [mass %] represents the content of $SnO_2$ at a glass surface, $C_0$ [mass %] represents the content of $SnO_2$ at a depth of 0.5 mm from the glass surface, and k [mass %/mm] represents an $SnO_2$ concentration gradient defined by $k=(C_1-C_0)/0.5$, the LAS-type float glass satisfies relationships of $K \leq 2$ and $C_0 \leq 0.8$ with respect to at least one surface thereof.

In the LAS-type crystallized glass of the present invention, the $SnO_2$ concentration gradient k [mass %/mm] from the glass surface to the depth of 0.5 mm from the glass surface and the content $C_0$ [mass %] of $SnO_2$ at the depth of 0.5 mm from the glass surface are defined as described above. As a result, it is possible to suppress undesirable other crystals of $SnO_2$ and coloring or a surface defect caused by a metal colloid. Thus, the LAS-type crystallized glass of the present invention has uniform transparency and an excellent surface quality, and has an advantage that its production cost is low because the surface of the glass is not required to be subjected to machine polishing.

Fifth, the present invention relates to a method of producing an LAS-type float glass, comprising a step of forming a molten glass into a plate shape on a bath of a molten metal, wherein, in the step of forming the molten glass, the ratio of an area of the molten glass accounting for on a surface of the molten metal is equal to or more than 40%.

In a float forming chamber, when metal tin vapor and oxygen react with each other to produce $SnO_2$ and this metal oxide is then diffused into a glass surface layer, undesired devitrification is induced in the glass surface layer. According to the production method of the present invention, the area of the molten glass accounting for on the surface of the molten metal such as molten tin is increased during glass forming, to thereby reduce the exposure area of the molten metal. As a result, it becomes possible to reduce the pressure of metal vapor volatilizing from the molten metal in the float forming chamber. Consequently, devitrification in the glass surface layer caused by the diffusion of $SnO_2$ into the glass surface layer can be suppressed.

DESCRIPTION OF EMBODIMENTS

In an LAS-type float glass and LAS-type crystallized glass of the present invention, each glass surface layer has an $SnO_2$ concentration gradient k of 2 mass %/mm or less, preferably 1.6 mass %/mm or less, more preferably 1.2 mass %/mm or less. The lower limit of the $SnO_2$ concentration gradient k is not particularly limited, but realistically is 0.01 mass %/mm or more.

Note that the $SnO_2$ concentration gradient in a glass surface may occur not only in the upper glass surface (surface not being in contact with a molten metal) in float forming but also in the lower glass surface (surface being in contact with the molten metal) in float forming. That is, as $SnO_2$ produced by oxidation of the molten metal is diffused into the glass surface layer, the $SnO_2$ concentration gradient may also occur in the lower glass surface. Thus, the LAS-type float glass of the present invention is characterized in that the $SnO_2$ concentration gradient with respect to one surface or both surfaces thereof falls within the range described above. Note that the $SnO_2$ concentration gradient k in the lower glass surface may exceed 2 mass %/mm.

Further, the content $C_0$ of $SnO_2$ at a depth of 0.5 mm from the glass surface is 0.8 mass % or less, preferably 0.6 mass % or less, more preferably 0.4 mass % or less. The lower limit of the content $C_0$ of $SnO_2$ is not particularly limited, but is preferably 0.01 mass % or more in order that a sufficient fining effect and a sufficient crystallization-enhancing effect are obtained.

When the $SnO_2$ concentration gradient k exceeds 2 mass %/mm or when the content $C_0$ of $SnO_2$ at the depth of 0.5 mm from the glass surface exceeds 0.8 mass %, devitrification tends to occur in glass or undesirable other crystals derived from $SnO_2$ tend to occur, during float forming. Moreover, coloring due to a metal colloid is also apt to occur. In particular, when the $SnO_2$ concentration gradient k exceeds 2 mass %/mm, devitrification in the glass surface layer becomes remarkable.

The LAS-type float glass of the present invention preferably comprises a composition containing, in terms of mass %, 55 to 75% of $SiO_2$, 17 to 27% of $Al_2O_3$, 2 to 5% of $Li_2O$, 0 to 1.5% of MgO, 0 to 1.5% of ZnO, 0 to 5% of BaO, 0 to 2% of $Na_2O$, 0 to 3% of $K_2O$, 0 to 4% of $TiO_2$, 0 to 2.5% of $ZrO_2$, 0 to 0.8% of $SnO_2$, and 2 to 6% of $TiO_2+ZrO_2+SnO_2$. The reasons for limiting the glass composition thereto are described below.

$SiO_2$ is a component that forms the skeleton of glass and constitutes an LAS-type crystal. The content of $SiO_2$ is 55 to 75%, preferably 58 to 72%, more preferably 60 to 70%. When the content of $SiO_2$ is less than 55%, the thermal expansion coefficient is apt to be high. On the other hand, when the content of $SiO_2$ is more than 75%, glass melting tends to be difficult.

$Al_2O_3$ is also a component that forms the skeleton of glass and constitutes an LAS-type crystal as $SiO_2$ is. The content of $Al_2O_3$ is 17 to 27%, preferably 17 to 24%. When the content of $Al_2O_3$ is less than 17%, the chemical durability lowers and glass is apt to devitrify. On the other hand, when the content of $Al_2O_3$ is more than 27%, the viscosity of glass becomes too large, and hence glass melting tends to be difficult.

$Li_2O$ is a component that constitutes an LAS-type crystal, gives a significant influence to the crystallinity, and has a function of lowering the viscosity of glass. The content of $Li_2O$ is 2 to 5%, preferably 2.5 to 5%, more preferably 3 to 5%. When the content of $Li_2O$ is less than 2%, the crystallinity of glass becomes weak and the thermal expansion coefficient is apt to be high. In addition, in a case where transparent crystallized glass is aimed to be obtained, a crystal substance is apt to develop white turbidity, and in a case where white opaque crystallized glass is aimed to be obtained, obtaining desired whiteness is apt to be difficult. On the other hand, when the content of $Li_2O$ is more than 5%, the crystallinity becomes too strong, and hence glass is apt to devitrify during float forming. In particular, obtaining a metastable β-quartz solid solution becomes difficult, and hence a crystal substance tends to develop white turbidity. As a result, obtaining transparent crystallized glass is apt to be difficult.

MgO, ZnO, BaO, $Na_2O$, and $K_2O$ have a function of controlling the precipitation amount of LAS-type crystals.

The content of MgO is 0 to 1.5%, preferably 0.1 to 1%. When the content of MgO is more than 1.5%, the crystallinity becomes strong. As a result, the thermal expansion coefficient tends to be high. In addition, MgO tends to accelerate coloring caused by $Fe_2O_3$ impurities in the presence of $TiO_2$. Further, glass is apt to devitrify because of undesired crystal precipitation at the time of forming.

The content of ZnO is 0 to 1.5% or preferably 0.1 to 1%. When the content of ZnO is more than 1.5%, the crystallinity becomes strong. As a result, ZnO tends to accelerate coloring caused by $Fe_2O_3$ impurities in the presence of $TiO_2$.

The content of BaO is 0 to 5%, preferably 0.3 to 4%, more preferably 0.5 to 3%. When the content of BaO is more than 5%, the precipitation of LAS-type crystals tends to be inhibited and the thermal expansion coefficient is apt to be high. In addition, a crystal substance tends to develop white turbidity. As a result, obtaining transparent crystallized glass is apt to be difficult.

The content of $Na_2O$ is 0 to 2%, preferably 0 to 1.5%, more preferably 0.1 to 1%. When the content of $Na_2O$ is more than 2%, glass is apt to devitrify during forming and the thermal expansion coefficient is apt to be high. In addition, a crystal substance tends to develop white turbidity. As a result, obtaining transparent crystallized glass is apt to be difficult.

The content of $K_2O$ is 0 to 3%, preferably 0 to 2%, more preferably 0.1 to 1.5%. When the content of $K_2O$ is more than 3%, the crystallinity becomes weak and the thermal expansion coefficient is apt to be high. In addition, a crystal substance tends to develop white turbidity. As a result, obtaining transparent crystallized glass is apt to be difficult.

$TiO_2$ is a component that functions as a nucleating agent. The content of $TiO_2$ is 0 to 4%, preferably 0.3 to 3%, more preferably 0.5 to 2%. When the content of $TiO_2$ is more than 4%, coloring caused by $Fe_2O_3$ impurities becomes remarkable and glass is apt to devitrify at the time of forming.

$ZrO_2$ is also a component that has a function as a nucleating agent. The content of $ZrO_2$ is 0 to 2.5%, preferably 0.1 to 2.2%. When the content of $ZrO_2$ is more than 2.5%, glass melting becomes difficult and glass is apt to devitrify at the time of forming.

$SnO_2$ is a component that has a fining effect and a crystallization-enhancing effect. The content of $SnO_2$ is 0 to 0.8%, preferably 0.01 to 0.6%, more preferably 0.1 to 0.4%. When the content of $SnO_2$ is more than 0.8%, glass is apt to devitrify, and devitrification is apt to occur in a glass surface layer particularly during float forming. In addition, coloring caused by $Fe_2O_3$ impurities becomes remarkable.

Further, $SnO_2$ has a function as a nucleating agent forming a $ZrO_2$—$TiO_2$—$SnO_2$-based crystal nucleus together with $TiO_2$ and $ZrO_2$, thereby providing a minute crystal. The total content of $TiO_2$, $ZrO_2$, and $SnO_2$ is 2 to 6%, preferably 2.5 to 5%, more preferably 2.5 to 4%. When the total content of those components is less than 2.5%, obtaining dense crystals becomes difficult. When the total content of those components is more than 6%, glass is apt to devitrify.

In addition, it is also possible to add Cl as a fining agent at 0 to 2% or preferably 0.1 to 1%. Cl has a function of enhancing the fining effect of $SnO_2$. Thus, combined use of $SnO_2$ and Cl as a fining agent is preferred because the combined use provides a very good fining effect. Note that when the content of Cl is more than 2%, the chemical durability tends to lower.

As described above, in general, $As_2O_3$ or $Sb_2O_3$ used as a fining agent is reduced directly by a reducing atmosphere in a float chamber to produce a metal colloid of As or Sb. As a result, undesired coloring tends to occur remarkably in a glass surface layer. Grinding and polishing are required to remove the undesirable coloring, which is disadvantageous in terms of the steps and cost. A sulfate such as sodium sulfate, a chloride (Cl) such as sodium chloride, cerium oxide, or the like can be used as a fining agent that hardly causes coloring due to a reducing action. Alternatively, the fining effect may be obtained by carrying out defoaming under reduced pressure, or by heating at a temperature, for example, exceeding 1780° C. during melting glass.

In addition to the above, $P_2O_5$ may be contained as a component for improving the crystallinity of glass. The content of $P_2O_5$ is 0 to 7%, preferably 0 to 4%, more preferably 0 to 3%. When the content of $P_2O_5$ is more than 7%, the thermal expansion coefficient becomes too high and a crystal substance tends to develop white turbidity. As a result, obtaining transparent crystallized glass is apt to be difficult.

The LAS-type crystallized glass of the present invention preferably comprises a composition containing, in terms of mass %, 55 to 75% of $SiO_2$, 17 to 27% of $Al_2O_3$, 2 to 5% of $Li_2O$, 0 to 1.5% of $MgO$, 0 to 1.5% of $ZnO$, 0 to 5% of $BaO$, 0 to 2% of $Na_2O$, 0 to 3% of $K_2O$, 0 to 4% of $TiO_2$, 0 to 2.5% of $ZrO_2$, 0 to 0.8% of $SnO_2$, and 2 to 6% of $TiO_2+ZrO_2+SnO_2$. The reasons for limiting the glass composition thereto are the same as those described above.

The thermal expansion coefficient of the LAS-type crystallized glass of the present invention in a temperature range of 30 to 750° C. is preferably −10 to $30\times10^{-7}/°$ C., more preferably −10 to $20\times10^{-7}/°$ C. When the thermal expansion coefficient falls within the range, glass excellent in thermal shock resistance is provided. Note that in the present invention, the thermal expansion coefficient refers to a value obtained by measurement with a dilatometer.

The thicknesses of the LAS-type float glass and LAS-type crystallized glass of the present invention are not particularly limited, and are appropriately selected depending on their applications. For example, the thicknesses of the LAS-type float glass and LAS-type crystallized glass of the present invention can be set to 1 to 8 mm, more preferably 1.5 to 6 mm, particularly preferably 2 to 5 mm.

According to the present invention, a large plate glass can be obtained. For example, it is possible to obtain an LAS-type float glass or an LAS-type crystallized glass each having a plate width of 2500 mm or more, or further, of 3000 mm or more.

Next, methods of producing the LAS-type float glass and LAS-type crystallized glass of the present invention are described.

First, raw glass materials are compounded so as to have predetermined composition. After the raw glass materials are mixed uniformly, the mixture of the raw glass materials is melted in a melting furnace. Here, in a case where one of $SnO_2$ and Cl is used or both of them are used in combination as a fining agent, melting is carried out under the conditions of 1550 to 1780° C., preferably 1580 to 1750° C. and 4 to 24 hours or preferably 12 to 20 hours. Note that in a case where a chemical fining agent, for example, $SnO_2$, a sulfate such as sodium sulfate, a chloride such as sodium chloride, or cerium oxide, is not used, melting may be carried out under the conditions of 1780° C. to 1880° C. and 10 to 35 hours, or defoaming may be carried out under reduced pressure during melting glass, in order to obtain a fining effect.

Next, the molten glass is formed into a plate shape by a float process. To be specific, in a float forming chamber in which a reducing atmosphere is maintained with a reducing gas, the molten glass is poured on a molten metal such as molten metal tin or a molten metal tin alloy, and is extended to be flat until an equilibrium thickness is obtained, to thereby yield a molten glass ribbon. Subsequently, the molten glass ribbon is drawn while being pulled until a predetermined thickness is obtained.

Note that the float forming chamber includes an upper casing and a lower casing each made of metal and equipped with a refractory, and there are provided an outlet, forming equipment for pulling a molten glass, and the like between the upper casing and the lower casing.

In the float forming chamber, when metallic tin vapor and oxygen react with each other to produce $SnO_2$, followed by the diffusion of $SnO_2$ into a glass surface layer, the content $C_1$ of $SnO_2$ at a glass surface and an $SnO_2$ concentration gradient k tend to be larger. As a result, undesired devitrification is induced in the glass surface layer. Thus, the devitrification in the glass surface layer can be suppressed by using the method described below.

In order to reduce the pressure of metal tin vapor volatilizing from the molten metal in the float forming chamber, for example, it is preferred that the exposure area of the molten metal be decreased compared with the area of the molten glass (the area of the molten glass accounting for on the surface of the molten metal be increased) by adjusting the amount of glass supplied into the float forming chamber. To be specific, the ratio of the area of the molten glass accounting for on the surface of the molten metal is preferably 40% or more, more preferably 50% or more, still more preferably 60% or more. If the ratio of the area of the molten glass accounting for on the surface of the molten metal is less than 40%, the metal tin vapor acts on the glass surface layer during forming process. As a result, other crystals of $SnO_2$ may precipitate, devitrification may be induced by the diffusion of $SnO_2$ into the glass surface layer, or undesired surface defects such as a dent may be caused because metal tin droplets directly drop on the molten glass. Note that the upper limit of the ratio is not particularly limited. However, the ratio is set to 100% or less, more preferably 90% or less, particularly preferably 80% or less, depending on the dimension of the float forming chamber and a target width of a glass plate.

A reducing gas is preferably supplied into the float forming chamber in order to prevent oxidation of the molten metal and oxidation of the metal tin vapor in the float forming chamber. Used as the reducing gas is preferably a mixed gas of 90 to 99.5% $N_2$ and 0.5 to 10% $H_2$ and more preferably a mixed gas of 92 to 99% $N_2$ and 1 to 8% $H_2$, in terms of vol %.

In addition, it is preferred that a reducing gas containing metal tin vapor be removed from the float forming chamber by discharging the reducing gas under reduced pressure from an outlet provided in the float forming chamber.

In order to reduce the influence of metal tin vapor on a glass ribbon, it is preferred that the distance between the ceiling made of a refractory provided in the upper casing made of metal in the float forming chamber and a molten glass ribbon be as short as possible. To be specific, the distance between the ceiling of the float forming chamber and the molten glass ribbon is preferably 80 cm or less, more preferably 60 cm or less. When the distance between the ceiling of the float forming chamber and the molten glass ribbon exceeds 80 cm, a difference in temperature between the vicinity of the molten glass ribbon and the vicinity of the ceiling is apt to occur in the float forming chamber. As a result, metal tin vapor is cooled to produce metal tin droplets, which drop on the glass ribbon, probably leading to surface defects.

After the molten glass is formed into a plate shape, the plate-shaped glass is lifted out at 700 to 850° C. from the molten metal in the float forming chamber, followed by annealing, to thereby yield an LAS-type float glass.

Subsequently, the LAS-type float glass is subjected to heat treatment (crystallization treatment) to yield an LAS-type crystallized glass. To be specific, first, the LAS-type float glass is kept at 700 to 800° C. for 1 to 4 hours to form a nucleus. Next, the resultant glass is subjected to heat treatment at 800 to 950° C. for 0.5 to 3 hours to precipitate a β-quartz solid solution in the case of converting to transparent crystallized glass, or the resultant glass is subjected to heat treatment at 1050 to 1250° C. for 0.5 to 2 hours to precipitate a β-spodumene solid solution in the case of converting to white opaque crystallized glass. As a result, an LAS-type crystallized glass is yielded.

The resultant LAS-type crystallized glass is used for various applications after post-processing such as cutting, polishing, or bending processing is performed or after painting or the like is performed on the surface.

EXAMPLES

Hereinafter, the LAS-type float glass and LAS-type transparent crystallized glass of the present invention are described in detail by examples. However, the present invention is not limited to those examples.

Glasses of Examples and Comparative Examples were produced as described below. Note that Sample Nos. 1 to 5, 8, and 9 are Examples, and Sample Nos. 6, 7, and 10 to 13 are Comparative Examples.

TABLE 1

| | | Sample No. | | |
|---|---|---|---|---|
| | | 1 to 6 | 7 to 10 | 11 and 12 |
| Glass composition [mass %] | $SiO_2$ | 65.6 | 65.7 | 64.8 |
| | $Al_2O_3$ | 22.14 | 22.2 | 22.2 |
| | $Li_2O$ | 4.2 | 4.2 | 4.2 |
| | $Na_2O$ | 0.5 | 0.5 | 0.5 |
| | $K_2O$ | 0.3 | 0.3 | 0.3 |
| | BaO | 1.5 | 1.5 | 1.5 |
| | $TiO_2$ | 2.0 | 2.0 | 2.0 |
| | $ZrO_2$ | 2.2 | 2.2 | 2.2 |
| | $P_2O_5$ | 1.4 | 1.4 | 1.4 |
| | $SnO_2$ | 0.16 | | 0.9 |
| | Total | 100.0 | 100.0 | 100.0 |
| Melting temperature-time | | 1550° C.-9 h 1650° C.-12 h | 1550° C.-9 h 1650° C.-18 h | 1550° C.-9 h 1650° C.-12 h |

TABLE 2

| | | Sample No. | | | | | | |
|---|---|---|---|---|---|---|---|---|
| | | 1 | 2 | 3 | 4 | 5 | 6 | 7 |
| Ratio of exposure area (glass:metal tin) | | 8:2 | 7:3 | 6:4 | 5:5 | 4:6 | 3:7 | 2:8 |
| Content of $SnO_2$ (mass %) | Glass surface $C_1$ | 0.22 | 0.27 | 0.31 | 0.62 | 1.06 | 1.30 | 1.55 |
| | Glass inside $C_0$ | 0.16 | 0.16 | 0.16 | 0.16 | 0.16 | 0.16 | 0.16 |
| $SnO_2$ concentration gradient k (mass %/mm) | | 0.12 | 0.22 | 0.30 | 0.92 | 1.80 | 2.28 | 2.78 |
| Depth of devitrification (mm) | | 0 | 0 | 0 | 0.2 | 0.4 | 1.5 | wholly devitrified |
| Transparency | | ⊚ | ⊚ | ⊚ | ○ | ○ | X | X |

TABLE 3

| | | Sample No. | | | |
|---|---|---|---|---|---|
| | | 8 | 9 | 10 | 11 |
| Ratio of exposure area (glass:metal tin) | | 7:3 | 5:5 | 3:7 | 2:8 |
| Content of $SnO_2$ (mass %) | Glass surface $C_1$ | 0.28 | 0.71 | 1.10 | 1.52 |
| | Glass inside $C_0$ | 0 | 0 | 0 | 0 |
| $SnO_2$ concentration gradient k (mass %/mm) | | 0.56 | 1.42 | 2.20 | 3.04 |
| Depth of devitrification (mm) | | 0 | 0.1 | 1.0 | wholly devitrified |
| Transparency | | ⊚ | ○ | X | X |

TABLE 4

| | Sample No. | |
|---|---|---|
| | 12 | 13 |
| Ratio of exposure area (glass:metal tin) | 3:7 | 2:8 |
| Content of $SnO_2$ (mass %) Glass surface $C_1$ | 1.92 | 2.25 |
| Glass inside $C_0$ | 0.9 | 0.9 |
| $SnO_2$ concentration gradient k (mass %/mm) | 2.04 | 2.70 |
| Depth of devitrification (mm) | — | — |
| Transparency | X | X |

First, each raw glass material was prepared so as to have each composition shown in Table 1. The each raw glass material was introduced into a platinum crucible and melted by using an electric furnace under each condition described in Table 1. Note that, in Table 1, the phrase "1550° C.-9 h, 1650° C.-12 h" means that a raw glass material was melted at 1550° C. for 9 hours and was then melted at 1650° C. for 12 hours, for example.

Next, the resultant molten glass was fed on a carbon surface plate and was formed by using a stainless steel roller so as to have a thickness of 7 mm. After that, the formed glass was cooled to room temperature by using an annealing furnace in which temperature had been set to 700° C. Thus, material glass for float forming was produced.

Subsequently, the material glass for float forming was used to carry out float forming as described below.

Metal tin was introduced into a carbon container and the material glass for float forming was placed on the metal tin, and then heat treatment was carried out in an electric furnace internally having a reducing atmosphere of 98 vol % nitrogen and 2 vol % hydrogen. In the heat treatment, temperature was increased at a rate of 20° C./min from room temperature to 1450° C., kept at 1450° C. for 10 minutes, then decreased at a rate of 20° C./min to 1250° C., and further decreased at a rate of 50° C./min from 1250° C. to 820° C. In the heat treatment, the amount of glass was adjusted so that the ratio of the area of the molten glass and the area of the exposure portion of the metal tin reached each value shown in Tables. After that, the resultant formed glass was taken out of the electric furnace and cooled to room temperature by using an annealing furnace. Thus, an LAS-type float glass was obtained.

The resultant LAS-type float glass was subjected to heat treatment at 780° C. for 3 hours and then at 870° C. for 1 hour by using an electric furnace, to thereby obtain an LAS-type crystallized glass. In any of the resultant LAS-type crystallized glasses, a β-quartz solid solution was precipitated as a main crystal and the average linear thermal expansion coefficient was in the range of −10 to 10×10$^{-7}$/° C.

The content of $SnO_2$ in the LAS-type crystallized glass was measured at a position of 1 μm and a position of 0.5 mm from the glass surface not being in contact with the metal tin by point analysis using energy dispersive X-ray spectrometry (EDX). As analyzing devices, a scanning electron microscope (S-4300SE manufactured by Hitachi, Ltd.) was used for observing surface states, and an energy dispersive X-ray spectrometer (EMAX ENERGY EX-250 manufactured by HORIBA, Ltd.) was used for surface elemental analysis. As measurement conditions, the working distance was set to 15 mm, the accelerating voltage to 10 KV, the beam current value to 35 μA, and the measurement magnification to 5000 times.

Note that the content of $SnO_2$ ($SnO_2$ concentration gradient) in the LAS-type float glass before crystallization was identical to the measurement value after crystallization in each sample.

Further, the depth of devitrification from the glass surface not being in contact with the metal tin of the LAS-type crystallized glass was measured by using an optical microscope.

The transparency of the LAS-type crystallized glass was evaluated as described below. That is, glass which was sufficiently transparent without devitrification was represented by "⊚", glass which was transparent by visual observation though devitrification was observed with an optical microscope (×500) was represented by "o", and glass in which devitrification was observed remarkably by visual observation and which was opaque was represented by "x".

Note that in the case where devitrification was observed in an LAS-type crystallized glass, devitrification was also observed in an LAS-type float glass before crystallization.

As evident from Tables 2 to 4, in any of the LAS-type crystallized glasses of Examples, the $SnO_2$ concentration gradient k was 2 mass %/mm or less and the content $C_0$ of $SnO_2$ was 0.8 mass % or less. Thus, the LAS-type crystallized glasses of Examples had less devitrification in the glass surfaces and were excellent in transparency. On the other hand, in each of the LAS-type crystallized glasses of Comparative Examples, the $SnO_2$ concentration gradient k or the content $C_0$ of $SnO_2$ was out of the range described above. Thus, the LAS-type crystallized glasses exhibited remarkable devitrification and were inferior in transparency.

The invention claimed is:

1. A LAS-type crystallized glass, which is formed by crystallizing a LAS-type float glass which is substantially free of $As_2O_3$ and/or $Sb_2O_3$ and precipitates a β-quartz solid solution or a β-spodumene solid solution as a main crystal by heat treatment, wherein, when $C_1$ [mass %] represents a content of $SnO_2$ at a glass surface, $C_0$ [mass %] represents a content of $SnO_2$ at a depth of 0.5 mm from the glass surface, and k [mass %/mm] represents an $SnO_2$ concentration gradient defined by $k=(C_1-C_0)/0.5$, the LAS-type float glass satisfies relationships of $0.01 \leq k \leq 2$ and $C_0 \leq 0.8$ with respect to at least one surface thereof.

2. A LAS-type crystallized glass, which is formed by crystallizing a LAS-type float glass, wherein the LAS-type crystallized glass is substantially free of $As_2O_3$ and/or $Sb_2O_3$, and comprises a β-quartz solid solution or a β-spodumene solid solution as a main crystal, wherein, when $C_1$ [mass %] represents a content of $SnO_2$ at a glass surface, $C_0$ [mass %] represents a content of $SnO_2$ at a depth of 0.5 mm from the glass surface, and k [mass %/mm] represents an $SnO_2$ concentration gradient defined by $k=(C_1-C_0)/0.5$, the LAS-type crystallized glass satisfies relationships of $0.01 \leq k \leq 2$ and $C_0 \leq 0.8$ with respect to at least one surface thereof.

3. The crystallized glass according to claim 1, wherein the LAS-type float glass comprises a composition containing, in terms of mass %, 55 to 75% of $SiO_2$, 17 to 27% of $Al_2O_3$, 2 to 5% of $Li_2O$, 0 to 1.5% of MgO, 0 to 1.5% of ZnO, 0 to 5% of BaO, 0 to 2% of $Na_2O$, 0 to 3% of $K_2O$, 0 to 4% of $TiO_2$, 0 to 2.5% of $ZrO_2$, 0 to 0.8% of $SnO_2$, and 2 to 6% of $TiO_2+ZrO_2+SnO_2$.

4. The crystallized glass according to claim 2, wherein the LAS-type float glass comprises a composition containing, in terms of mass %, 55 to 75% of $SiO_2$, 17 to 27% of $Al_2O_3$, 2 to 5% of $Li_2O$, 0 to 1.5% of MgO, 0 to 1.5% of ZnO, 0 to 5% of BaO, 0 to 2% of $Na_2O$, 0 to 3% of $K_2O$, 0 to 4% of $TiO_2$, 0 to 2.5% of $ZrO_2$, 0 to 0.8% of $SnO_2$, and 2 to 6% of $TiO_2+ZrO_2+SnO_2$.

* * * * *